Figure 1:
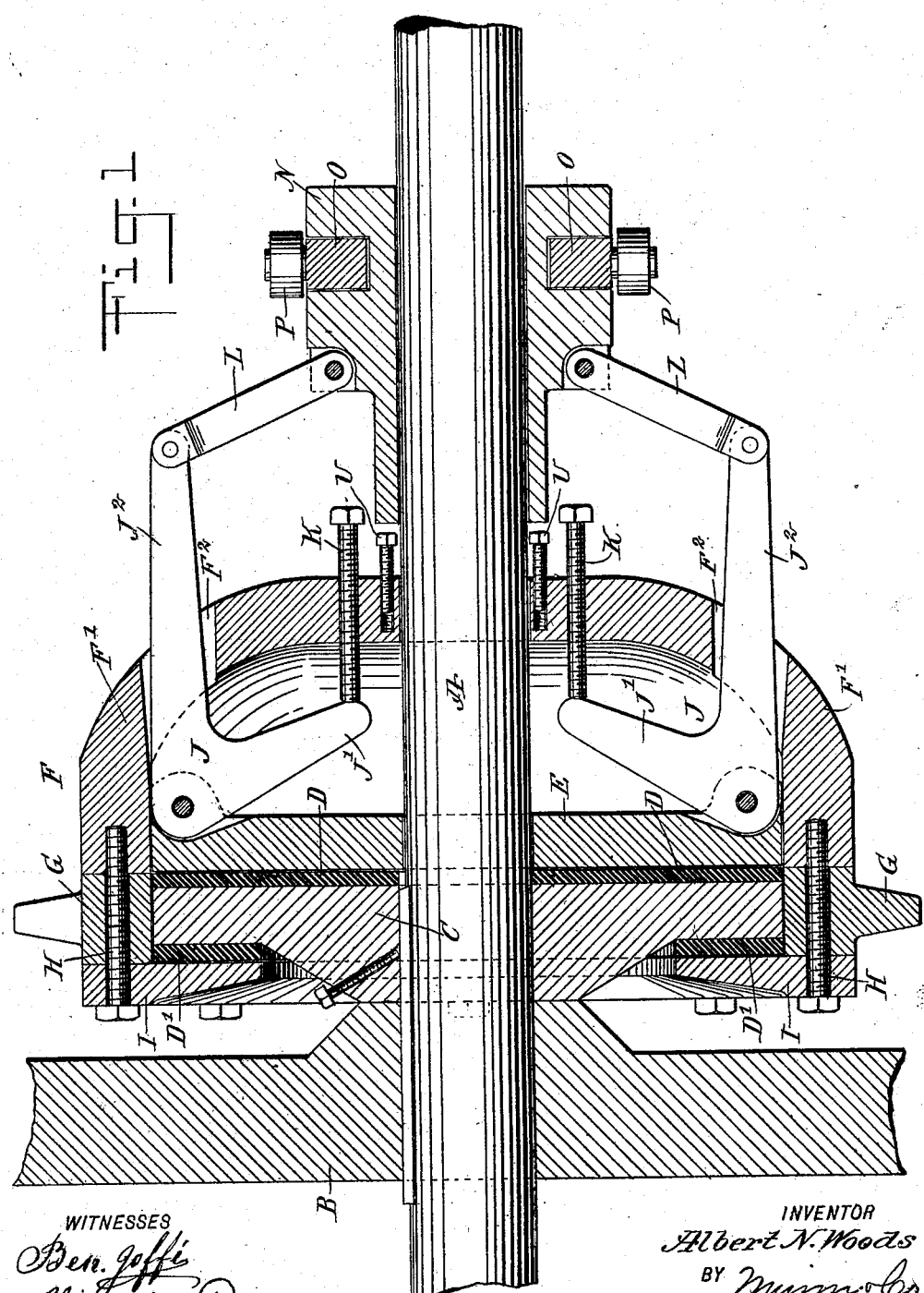

A. N. WOODS.
FRICTION CLUTCH.
APPLICATION FILED FEB. 4, 1908.

916,086.

Patented Mar. 23, 1909.
2 SHEETS—SHEET 1.

WITNESSES

INVENTOR
Albert N. Woods
BY
ATTORNEYS

A. N. WOODS.
FRICTION CLUTCH.
APPLICATION FILED FEB. 4, 1908.
916,086.
Patented Mar. 23, 1909.
2 SHEETS—SHEET 2.
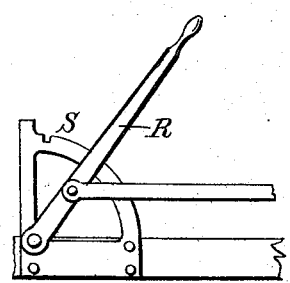
Fig. 2.
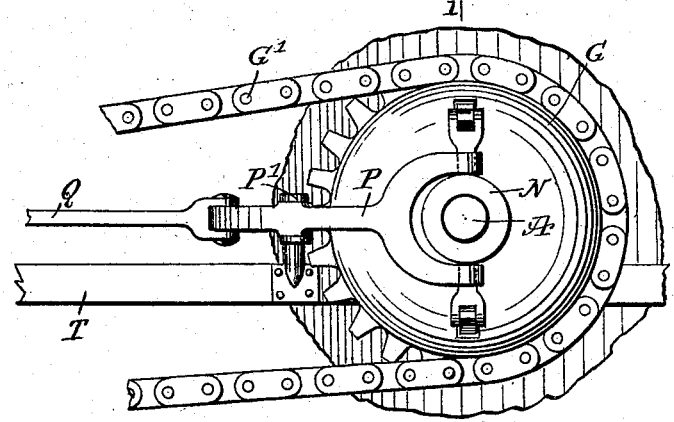
Fig. 4.
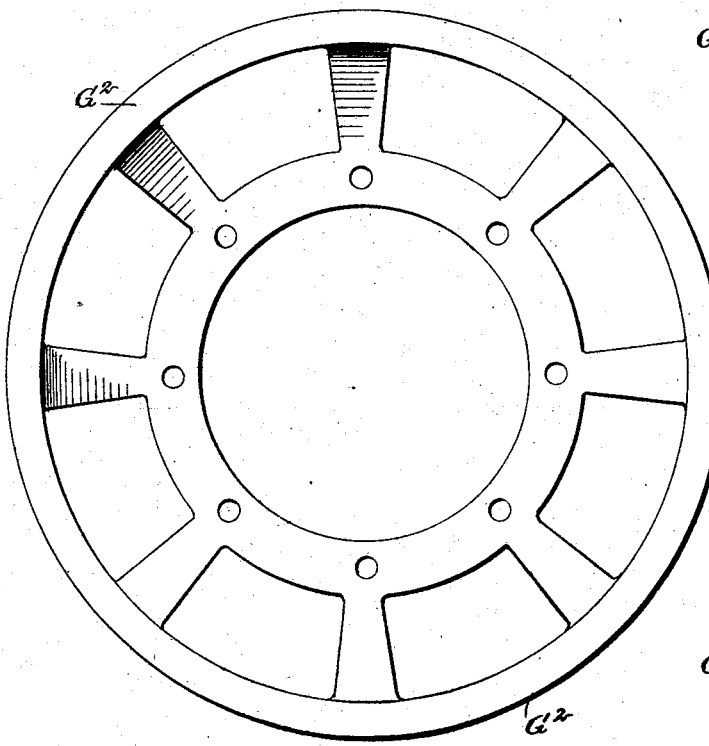
Fig. 3.
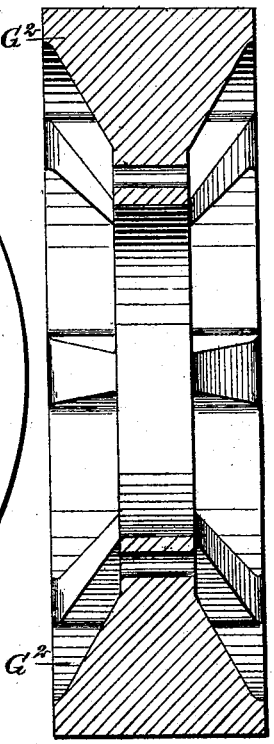
WITNESSES
Ben Jaffe
INVENTOR
Albert N. Woods
BY
ATTORNEYS
THE NORRIS PETERS CO., WASHINGTON, D. C.

UNITED STATES PATENT OFFICE.

ALBERT N. WOODS, OF CORVALLIS, OREGON.

FRICTION-CLUTCH.

No. 916,086.　　　　Specification of Letters Patent.　　　Patented March 23, 1909.

Application filed February 4, 1908.　Serial No. 414,222.

*To all whom it may concern:*

Be it known that I, ALBERT N. WOODS, a citizen of the United States, and a resident of Corvallis, in the county of Benton and State of Oregon, have invented a new and Improved Friction-Clutch, of which the following is a full, clear, and exact description.

The object of the invention is to provide a new and improved friction clutch, for use in traction engines and other machines, and arranged to permit convenient manipulation on the part of the operator for throwing the clutch in or out of gear, to powerfully transmit the motion of the driven shaft to other machinery and to insure long life of the working parts.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a longitudinal sectional elevation of the improvement on the line 1—1 of Fig. 2; Fig. 2 is an end elevation of the improvement as applied; Fig. 3 is a face view of a pulley adapted to replace the sprocket wheel shown in Fig. 1. Fig. 4 is a longitudinal sectional elevation of the same on the line 4—4 of Fig. 3.

On the driven or engine shaft A are secured the fly wheel B and the clutch member C, in the form of a disk, carrying on opposite sides friction surfaces D and D', of wood, fiber or other suitable material.

The friction surface D is adapted to be engaged by a friction plate E, mounted to slide loosely on the shaft A, and in the bowl-shaped body F' of the transmission member F, mounted to slide loosely on the shaft A. On the body F' of the transmission member F is removably secured a sprocket wheel G by the use of bolts H, also engaging a ring-shaped friction plate I for contact with the friction surface D' on the fixed clutch member C. The sprocket wheel G is connected by a sprocket chain G' with the device or machinery to be driven, but, if desired, a pulley G² (see Figs. 3 and 4) may be substituted for the sprocket wheel G and secured by the bolts H to the body F' of the transmission member F, to connect the transmission member by belt and pulleys with the machinery to be driven instead of by sprocket wheels and chains.

On the friction plate E are fulcrumed a plurality of bell crank levers J, each having one leg J' abutting against a set screw K, screwing in the body F' of the transmission member F, the other leg J² of each bell crank lever J extending through a slot F² formed in the body F' of the transmission member F. Thus when the friction plate E turns, the bell crank levers J are carried along and turn the transmission member F.

The outer ends of the legs J² of the bell crank levers J are pivotally connected by links L with a shifting collar N, mounted to slide loosely on the shaft A, and provided with a ring O, engaged by the shifting lever P, connected by a link Q (see Fig. 2), with a hand lever R, under the control of the operator, and adapted to be locked in place on a quadrant S, attached to the frame T of the machine on which the friction clutch is used. As shown in Fig. 2, the shifting lever P is fulcrumed at P' on the frame T.

The sliding movement of the collar N toward the transmission member F is limited by stop screws U, screwing in the body F' of the said transmission member F.

When the several parts are in the position shown in Fig. 1 and the shaft A is running, and the operator actuates the lever R and causes the collar N to move toward the transmission member F, then the links L impart a swinging motion to the bell crank levers J, whereby the friction plate E is moved to the left and pressed in contact with the friction surface D of the clutch member C, and the transmission member is caused to slide to the right, thus moving its friction plate I in a like direction and in frictional contact with the friction surface D' of the clutch member C. As the clutch member C rotates with the shaft A, it is evident that the plates E and I, now in frictional contact with the friction surfaces D, D', are carried along, thus rotating the transmission member F. When the collar N is shifted to the right by the operator moving the lever R correspondingly, then the friction plates E and I are moved out of frictional engagement with the friction surfaces D and D', and cease to rotate, thus stopping the rotary motion of the transmission member F.

The friction clutch shown and described is very simple and durable in construction, and composed of comparatively few parts, not liable easily to get out of order, thus insuring long life of the device.

By providing the frictional surfaces on both sides of the clutch member C and engaging the same by the friction plates E and I simultaneously, an extremely powerful transmission is obtained.

Having thus described my invention, I claim as new and desire to secure by Letters Patent:

1. The combination with a driven shaft, of a driving member comprising a bowl-shaped body mounted to slide loosely on the driven shaft, an annular transmission member abutting the edge of the body, a ring abutting the edge of the transmission member, screws securing said members together, a disk secured to the shaft within the transmission member, a disk slidable on the shaft within the body, bell crank levers pivoted to the last named disk, a collar slidable on the shaft, links connecting one end of the bell crank levers with the collar and stops for engagement by the other end of said levers.

2. In a friction clutch, the combination with the driven shaft, of a bowl-shaped driving member slidable thereon, a ring secured to the edge of the bowl-shaped member, a friction disk secured to the shaft within the ring, and provided on its opposite faces with friction surfaces, a disk within the bowl-shaped body slidable on the shaft, and means for moving the last named disk to clamp the first named disk between the last named disk and the ring.

In testimony whereof I have signed my name to this specification in the presence of two subscribing witnesses.

ALBERT N. WOODS.

Witnesses:
 E. D. HORGON,
 B. M. THORP.